ELECTRONIC SWITCHING SYSTEM FOR MAGNETIC TAPE APPARATUS

Filed March 20, 1961 5 Sheets-Sheet 1

BOYD L. STRATTON
INVENTOR.

BY Nathan N. Kallman

ATTORNEY

ELECTRONIC SWITCHING SYSTEM FOR MAGNETIC TAPE APPARATUS

Filed March 20, 1961 5 Sheets-Sheet 2

BOYD L. STRATTON
INVENTOR.

BY Nathan N. Kallman

ATTORNEY

Oct. 6, 1964 B. L. STRATTON 3,152,226
ELECTRONIC SWITCHING SYSTEM FOR MAGNETIC TAPE APPARATUS
Filed March 20, 1961 5 Sheets-Sheet 3

BOYD L. STRATTON
INVENTOR.
BY Nathan N. Kallman
ATTORNEY

BOYD L. STRATTON
INVENTOR.
BY Nathan N. Kallman
ATTORNEY

ELECTRONIC SWITCHING SYSTEM FOR MAGNETIC TAPE APPARATUS

Filed March 20, 1961 5 Sheets-Sheet 5

BOYD L. STRATTON
INVENTOR.

BY Nathan N. Kallman

ATTORNEY 3,152,226

ELECTRONIC SWITCHING SYSTEM FOR MAGNETIC TAPE APPARATUS

Boyd L. Stratton, Redwood City, Calif., assignor to Ampex Corporation, Redwood City, Calif., a corporation of California Filed Mar. 20, 1961, Ser. No. 97,051
10 Claims. (Cl. 179—100.2)

This invention relates to magnetic tape apparatus, and in particular to a novel switching means for use with magnetic tape reproducers employing a plurality of transducers.

In magnetic tape systems used for magnetically recording and/or reproducing signals over a wide frequency spectrum, a rotary drum assembly carrying a plurality of equally spaced magnetic heads at its periphery is employed to scan a longitudinally moving magnetic tape transversely for recording a signal or for reproducing the recorded signal information on successive parallel tracks. Before one head begins to lose contact with the magnetic tape, the succeeding head makes contact so that identical information is recorded on the tape at the end of one transverse track and the beginning of the next transverse track. Switching means is provided for reproduction of the recorded signal on successive tracks by combining reproduced signal portions to form a substantially continuous output signal. The switching operation is accomplished during the "overlap" period in the reproduce mode; that is, when two successive heads both contact the tape. As is known, standard television signals include blanking intervals at the end of each horizontal video line and between each vertical field. Therefore, the switching operation is made to occur during such blanking intervals so that none of the video information signal is lost as a result of the switching. Such a system, utilized for video or television signal processing, is described in U.S. Patents 2,916,546 and 2,968,692 both issued to C. P. Ginsburg et al.

However, there is a strong need for magnetic tape systems that can effectively process continuous wideband or high frequency signals, such as continuous radar or video information. The rotary head assembly type of magnetic apparatus is especially adaptable for processing such high frequency signal information. However, if there is a continuous supply of information being received with no blanking intervals or other predetermined information signal gaps, then there may be a loss of signal information during the switching operation.

An object of this invention is to provide an improved magnetic tape reproducing system.

Another object of this invention is to provide a magnetic tape system that is capable of processing continuous wideband signals with no appreciable loss of information.

A further object of this invention is to provide a switching circuit in an electronic system for processing recorded data wherein there is a gradual transfer of signal information between a plurality of circuits.

According to this invention, a plurality of gating circuits are employed during the reproduce mode in a magnetic tape apparatus for controlling the combination of a plurality of frequency modulated information signals, time-spaced during transverse recording and having overlapping or duplicated signal information. The recorded information signals are received through the rotary magnetic heads that scan a recorded magnetic medium or tape, and are applied alternately to the gating circuits concurrently with control signals that have ramps or sloping portions, such as a trapezoidal waveform, for example. The gating circuits are operated so that they are alternately conducting and nonconducting, and so that the conducting period substantially coincides with the time during which an information signal is applied to the conducting gate.

However, during the interval when overlapping information is received from the recorded magnetic medium or tape and from the rotary heads, the ramps of the control signals appear, and are applied to the gates in inverse polarity. Therefore, as one gating circuit is being biased from an "On" to an "Off" condition, the other symmetrical gate is going from "Off" to "On". In the interim between the total "Off" and "On" states and during the switching interval, each gate contributes only in proportion to the composite output signal, dependent upon the amplitude of the control signal ramps. Thus, the amplitude of the total signal output remains substantially constant during the overlap period, and a faithful representation of the recorded information is reproduced.

Furthermore, since the ramp signal portions are made to coincide with the switching intervals between heads, the transfer from one information output signal to another may be gradual in accordance with the slope of the ramp. Thus, any transient signal that may develop during the relatively short switching interval is dissipated over several cycles of the information signal that is processed during such interval so that the effect on the signal-to-noise ratio of the system is minimized.

In a particular embodiment of the invention, two wideband frequency modulated signals are derived from a rotary magnetic head assembly in a tape reproducing apparatus, and are respectively applied to two balanced diode gates. A synchronizing signal that is also derived from the rotary head assembly corresponding to the frequency of rotation of the assembly is fed to a gate pulse generator that includes a bistable multivibrator and a low pass filter having a Bessel characteristic for converting the synchronizing pulses to a trapezoidal waveform control signal. The wideband frequency modulated signals are passed through the gates in sequence, and switching between the signals corresponds in time to the occurrence of the ramps or sloping portions of the control signal. The gated signals are combined in a common output circuit, and the combined signal is then clipped in a limiter and processed further in a demodulation and utilization circuit.

The invention will be described in greater detail with reference to the drawing, in which.

Figure 1:
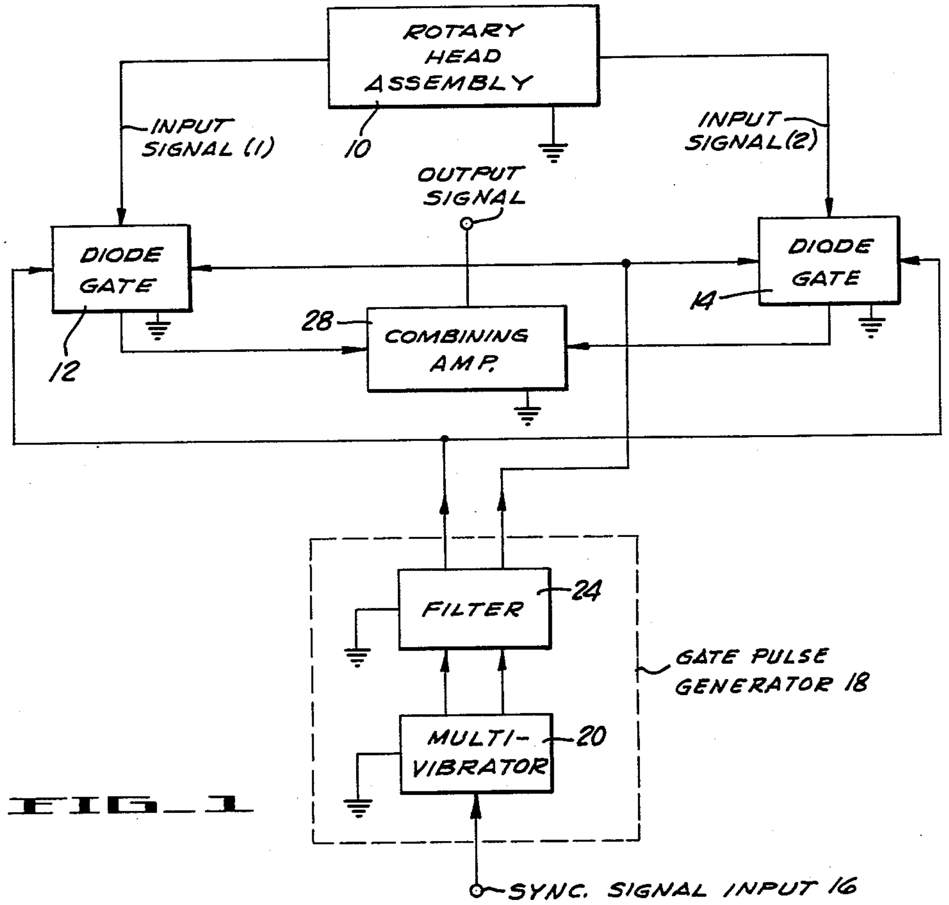
FIGURE 1 is a simplified block diagram showing an embodiment of this invention.
Figure 4:
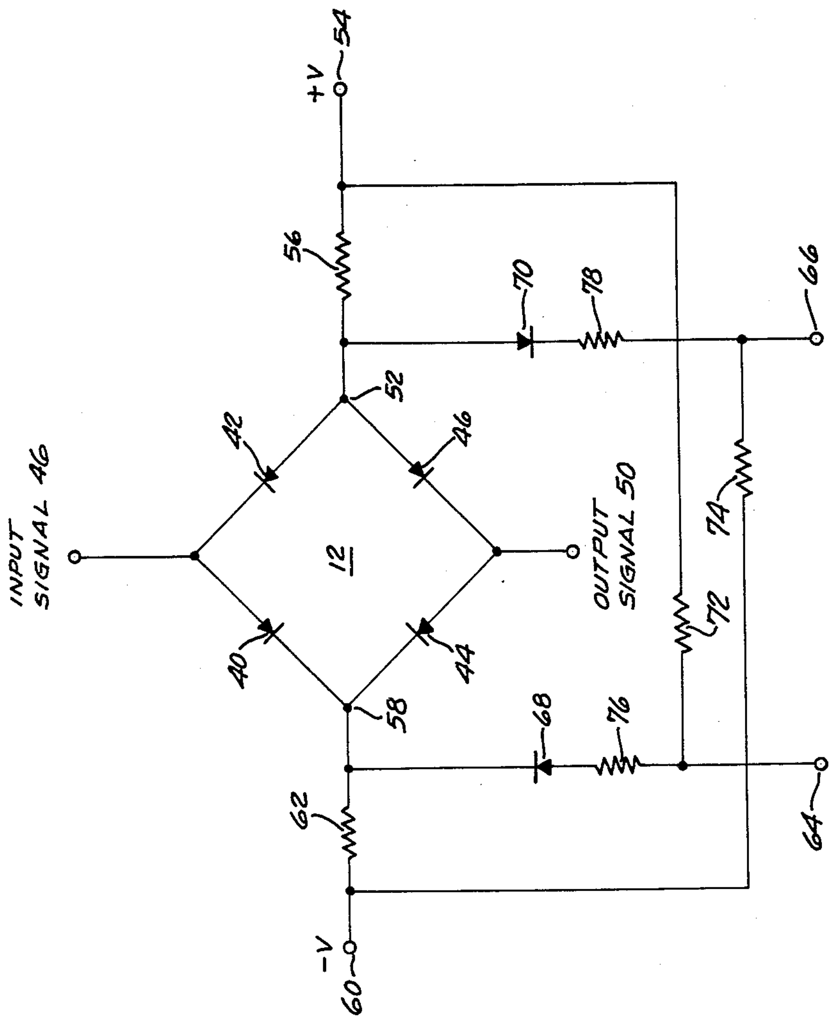
Figure 5:
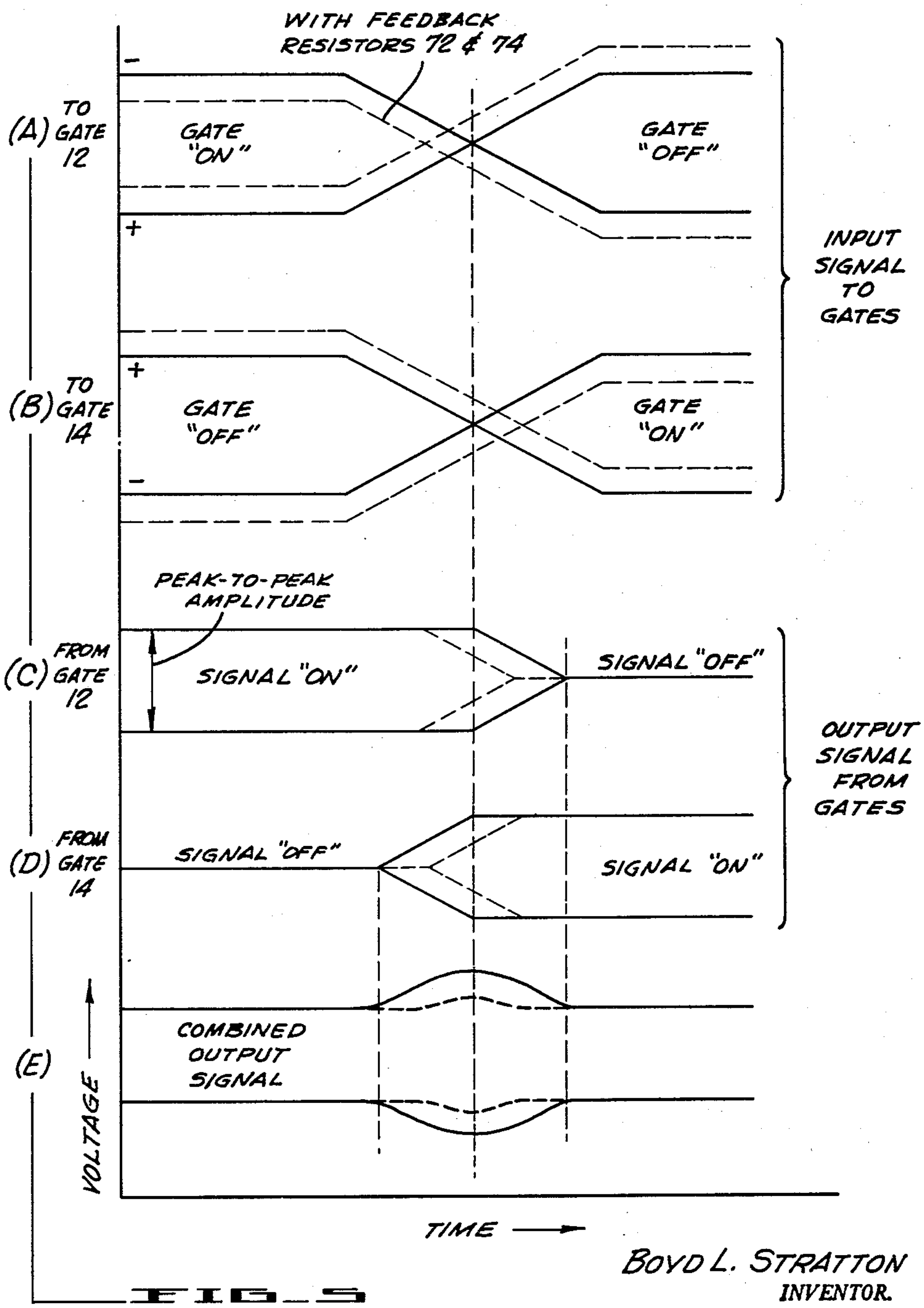
Figure 6:
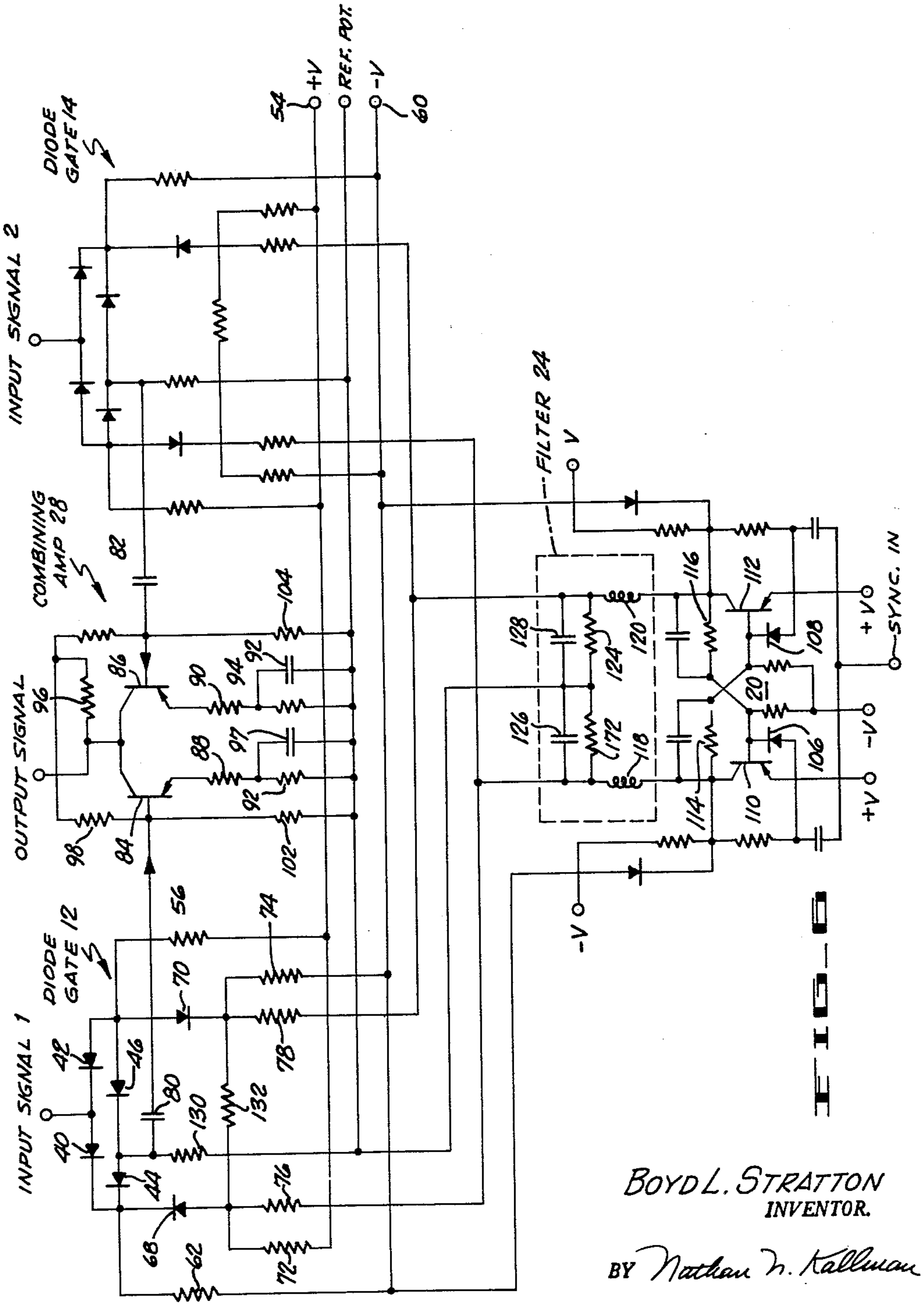

FIGURES 3*a–e* are a group of waveforms illustrating the operation of the system of this invention;

FIGURE 4 is a circuit diagram of a diode gate, such as used in the system of this invention;

FIGURES 5*a–e* are additional waveforms useful in the explanation of this invention; and FIGURE 6 is a schematic circuit diagram related to the system shown in FIGURE 1.

In FIGURE 1, an embodiment of this invention includes a rotary head assembly 10, which may have four equally spaced magnetic heads disposed circumferentially on a rotary drum in a magnetic tape apparatus, such as described in the aforementioned U.S. Patent 2,916,546. Information signals derived from a recorded magnetic tape are processed by the consecutively spaced heads in sequence, but are supplied alternately to a pair of diode gates 12 and 14.

Figure 2:
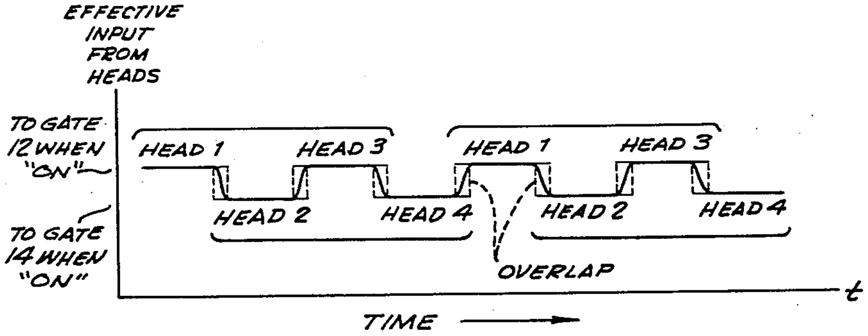
FIGURE 2 is an illustrative diagram to aid in the explanation of the invention.
Figure 3:
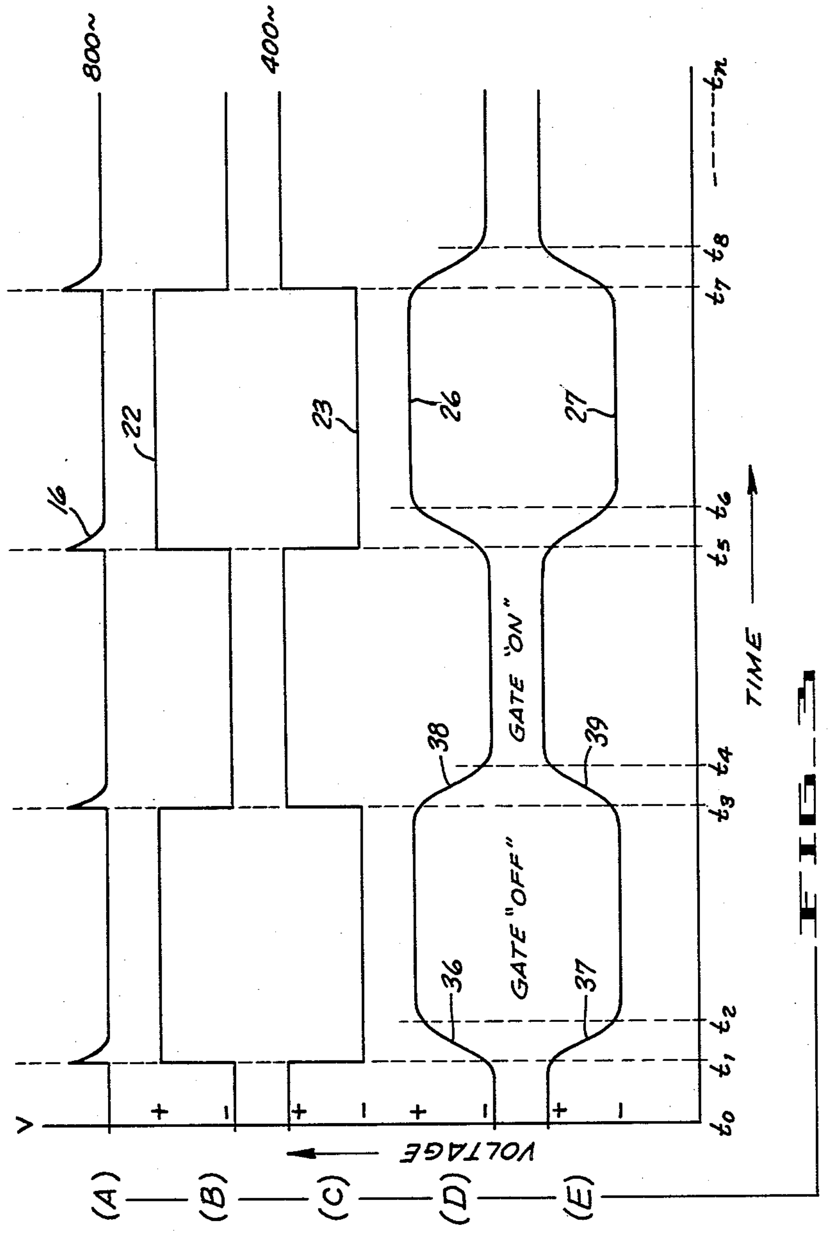

In a system utilizing four transducers on a rotary drum assembly, this is achieved by reducing the number of signals received in sequence from the heads from four to two in a first switcher. That is, signals from alternate heads are combined in one channel, and the signals from the other pair of alternate heads are combined in a second information channel. These two channels have no overlapping information, as depicted in FIGURE 2. Thus, a pair of opposing magnetic heads spaced 180° apart channel electrical information signals to diode gate 12, and a second pair of opposing heads disposed alternately between the heads of the first pair direct electrical information signals to diode gate 14, as delineated in FIGURE 2. At the output of the diode gates 12 and 14, the gated signals are properly combined to provide a continuous signal representative of the recorded information. However, in the recording process the recorded tracks have overlapping signal information that must be processed to be suitably reproduced. Furthermore, such information that appears during the switching interval is subject to transient effects and noise signals, such as may result from signal phase errors.

A transient signal may appear at the output of the system as a result of any phase difference between the two signals being combined. Because the system is a frequency modulation system, the output signal amplitude at any instant is proportional to $$\frac{d\phi}{dt}$$

i.e., the rate of change of phase of the output signal. During a phase switching operation, $dt$ (switching interval) is very small so that the amplitude of a transient signal introduced by phase variation during the switching interval is large. On the other hand, during a slow switching operation as employed with the instant invention, $dt$ is made as large as possible so that for a given phase error, $d\phi$, the output transient signal that is a function of $$\frac{d\phi}{dt}$$

is minimized.

In accordance with this invention, a synchronizing pulse signal 16 that is derived concurrently with the information signal from the rotary heads is applied to a gate pulse generator 18. The synchronizing signal 16 (FIGURE 3*a*), which may be an 800 cycle per second frequency pulse signal that is keyed to the angular velocity of the head drum, is directed to a bistable multivibrator 20, substantially similar to the flip-flop circuit illustrated in "Basic Theory and Application of Transistors," Army Technical Manual, TM11–690, page 203. The flip-flop circuit 20 transforms the sharp synchronizing pulses 16 to two square waves 22 and 23 (FIGURES 3*b* and 3*c*) of opposite polarity each having a 400 cycle per second frequency. The two square wave signals 22 and 23 are then channeled to a low pass filter 24 having a linear phase characteristic such as shown in Hughes Research Laboratories Technical Memorandum No. 427, entitled "Network Design by Use of Modern Synthesis Techniques and Tables," pages 15–20, published April 1956, and defined in "Principles of Circuit Synthesis," by Kuh and Pederson, pages 25–27, published by McGraw-Hill in 1959.

The square wareforms 22 and 23 are shaped so as to provide trapezoidal type waveforms 26 and 27 of opposite polarity (FIGURES 3*d* and 3*e*), having positive and negative slopes or ramps 36, 37, 38 and 39, respectively, initiated at the leading and trailing edges of the square wave signals 22 and 23 respectively. The trapezoidal waveform signals 26 and 27 are both applied to each of the pair of symmetrical diode gates 12 and 14, such that the gates are biased to switch "On" and "Off" alternately. However, during the switching intervals, there is a gradual transfer of the "On-Off" operation from one gate to the other that coincides with the periods at which the slopes or ramps 36 and 37 or 38 and 39 occur. The diode gates 12 and 14 provide a continuous signal to a combining amplifier or adder 28, with each diode gate contributing in proportion to the total output during the switching interval. The output from the amplifier 28 may then be channeled to a limiter (not shown) for clipping of the combined signal, and then to a detector (not shown) for demodulation.

For the purpose of convenience of explanation, the following description will be limited to the operation of the first diode gate 12, it being understood that the second diode gate 14 functions similarly but in opposite phase to the first diode gate 12. That is, when the first diode gate 12 is conducting to provide an output signal, the second diode gate 14 is nonconducting, and vice versa. However, during the switching intervals, there is coaction of the diode gates 12 and 14, as will be explained hereinafter.

In FIGURE 4, a single diode gate 12 comprises four gating diodes 40, 42, 44, and 46 arranged in a bridge configuration. An example of a diode gate, such as employed in this embodiment of the invention, is shown in "Pulse and Digital Circuits," Millman and Taub, pages 445–447, published by McGraw-Hill Book Company in 1956. An input signal from the rotary head assembly 10, which includes recorded information spaced in time received from opposing heads, is applied at a terminal 48 coupled between the cathode of diode 42 and the anode of diode 40. An output signal may be derived from a terminal 50 coupled between the cathode of diode 46 and the anode of diode 44. A positive bias voltage is supplied to a junction 52 between the anodes of diodes 42 and 46 from a supply terminal 54 through a resistor 56, and a negative bias voltage is supplied to a junction 58 between the cathodes of diodes 40 and 44 from a voltage source 60 through a resistor 62. The value of the resistor 62 is such that a correct bias current is supplied to the diode gate, and the resistor current substantially equals the desired peak signal current. Thus, in the absence of any other biasing voltages or currents, the diodes 40–46 are normally conducting.

In operation, the trapezoidal wave signals 26 and 27 are received from the pulse generator 18 and are applied to a pair of control terminals 64 and 66, respectively. The wave signals 26 and 27 are employed to bias a pair of control diodes 68 and 70, respectively, that control the gating action of the diode gate 12.

The "On-Off" condition of the diode gagte is regulated by the diodes 68 and 70 so that when the control waveform 26 is positive in polarity, when applied to the terminal 64, the diode 68 is forward biased and conducting. At the same time, the control waveform 27, which is negative in polarity, is applied to terminal 66 causing the control diode 70 to conduct also. The resultant current that passes through diodes 68 and 70 reverse bias the gating diodes 40–46, thereby causing the gating circuit to close. On the other hand, when the waveforms 26 and 27 are respectively negative and positive in polarity, the diode 68 and 70 are nonconducting, and the diode gate is open and passes the information input signal. Thus, with reference to FIGURE 3, during the intervals $t_2$–$t_3$, $t_6$–$t_7$, . . . , the diode gate is nonconducting and does not pass any of the information signal that is received at the input terminal 48. Conversely, during the intervals $t_4$–$t_5$, . . . , the diode gate 12 is conducting and the information signal is transmitted through the gate to the combining amplifier 28 and an output circuit for further processing. Since the control waveforms 26 and 27 are fed to the diode gates 12 and 14 in antiphase, the gates transmit the information signals, alternately supplied to them, in alternating sequence to an output circuit or the combining amplifier 28.

However, again referring to FIGURE 3, at those intervals $t_1$–$t_2$, $t_3$–$t_4$, $t_5$–$t_6$, . . . , when the ramps or sloping portions 36–39 of the control signals 26 and 27 occur, both gates 12 and 14 are partially conducting to the extent that the combined frequency modulated output signal has a relatively constant voltage, as seen in FIGURE 5*e*. FIGURES 5*a* and 5*b* represent the separate input signals to the gates 12 and 14, as shown in solid lines having opposite polarities, and further depicts the transfer period during which gate 14 assumes the "On" function from gate 12 ($t_5$–$t_6$). FIGURES 5*c* and 5*d* illustrate the peak-to-peak output signals derived from each of the gates 12 and 14 that are directed to the combining amplifier 28 for further processing. Thus, the information signals are passed by the gates 12 and 14 to a common output circuit in proportions determined by the ratio of the direct bias currents supplied to the diode gates from the gate pulse generator 18.

With further reference to FIGURE 4, the diode gate 12 includes a bias resistor 72 coupled between power supply 54 and control terminal 64. Similarly, a bias resistor 74 is coupled between power supply terminal 60 and control bias terminal 66. The values of the bias resistors 76 and 78 are less than that of resistors 56 and 62 so that a reverse bias may be provided to the diodes 40–46. Without the resistors 72 and 74, the timing relationship of the gating signals is such that during the crossover interval, when the diode gates 12 and 14 change functions, an undesirable variation occurs in the output signal voltage, as shown by the solid line in FIGURE 5*e*. However, the resistors 72 and 74 provide reverse bias to the gating diodes thereby delaying the action of the gate 14 when it assumes the "On" mode, and advances the time at which the gate 12 begins to operate in the "Off" condition, as shown by the dotted lines in FIGURES 5*a*–5*d*. Similarly, when the gate 14 goes "Off" and the gate 12 goes "On," there is a respective advance and delay as a result of the feed back provided by resistors 72 and 74. Furthermore, the inclusion of the resistors 72, 74 and the resultant advance and delay in switching between gates cause the gating diodes to operate on the linear portion of the ramps 36–39.

In FIGURE 6, a detailed schematic circuit is shown comprising the multivibrator 20, the low pass filter 24, the diode gates 12 and 14 and the combining amplifier 28. The diode gates 12 and 14 receive input signals from the rotary head assembly 10, as described heretofore. The diode gates 12 and 14 are basically similar to the diode gate illustrated and described with reference to FIGURE 4, and also includes coupling capacitors 80 and 82 that couple the gates 12 and 14 to the bases of transitors 84 and 86 found in the combining amplifier 28. A termination resistor 130 provides a resistive load for the diode gate 12. A resistor 132 serves to decrease any unbalance caused by the gating control signals 26 and 27 by dividing the signal voltages to the minimum necessary for reverse biasing the control diodes 68 and 70 during signal transmission through either of the gating circuits 12 and 14, and for reverse biasing the diodes 40–46 in the other gating circuit that is not passing information signals.

The emitters of the transistors 84 and 86 are connected to degeneration resistors 88 and 90 that, in turn, are connected in series with bias resistors 92 and 94. By-pass capacitors 97 and 99 are connected across the bias resistors 92 and 94, in a well-known manner. The collectors of transistors 84 and 86 have a common load resistor coupled thereto and further biasing of the transistor circuit is achieved by resistors 98, 100, 102, and 104. The output signal is obtained from the common load resistor 96 connected across the collectors.

The multivibrator circuit 20 includes diodes 106 and 108 which control a pair of transistors 110 and 112 that form part of the flip-flop circuit. The output of the multivibrator 20 is derived through RC circuits 114 and 116, and is applied to the low pass filter 24. The filter, which has a Bessel characteristic, includes inductances 118 and 120, load resistors 122 and 124 coupled across the inductances, and a pair of capacitors 126 and 128 connected in parallel with the resistors. The output signals, which are the trapezoidal control signals 26 and 27, are applied to the diode gates 12 and 14 in accordance with the above description. It is noted that the structure of the diode gates 12 and 14 are similar but the diode configurations are reversed such that the control bias waveforms 26 and 27 cause one diode gate to conduct while the other is nonconducting at any given instant.

In a particular embodiment of the invention, the following values for the circuit elements were used successfully:

| | | |
|---|---|---|
| **56** | ohms | 20K |
| **62** | do | 20K |
| **72** | do | 33K |
| **74** | do | 33K |
| **76** | do | 10K |
| **78** | do | 10K |
| **80** | mfd | .1 |
| **82** | do | .1 |
| **88** | ohms | 300 |
| **90** | do | 300 |
| **92** | do | 1K |
| **94** | do | 1K |
| **96** | do | 1K |
| **97** | mfd | .1 |
| **98** | ohms | 18K |
| **99** | mfd | .1 |
| **100** | ohms | 18K |
| **102** | do | 4.7K |
| **104** | do | 4.7K |
| **118** | millihenries | 200 |
| **120** | do | 200 |
| **122** | ohms | 440 |
| **124** | do | 440 |
| **126** | mfd | .01 |
| **128** | do | .01 |
| **130** | ohms | 1K |
| **132** | do | 4.7K |

There has been described herein an electronic switching circuit for a magnetic tape reproducer wherein discrete lines of signal information recorded transversely on a magnetic tape are received sequentially through a plurality of rotating magnetic transducers that scan the recorded tape. By the control of a plurality of gates that are utilized for passing the information to an output circuit, the separate transverse recorded lines that contain overlapping information are combined to provide a continuous composite signal having reduced noise signal during the switching between the transducers.

It is understood that the invention is not limited to the particular embodiment or parameter values described above. For example, the control signal for the gating circuits, such as the trapezoidal waveform, may be generated by ramp generating feedback circuits such as a phantastron, Miller amplifier or bootstrap type circuit. Also, the gated information signals may be combined at the base of a common emitter amplifier rather than in the common collector resistor of the combining amplifier. Furthermore, more than two diode gates may be employed to process a multiplicity of information signal portions to provide a composite continuous signal having no overlap. Thus, various circuit configurations may be employed to achieve the objectives defined herein without departing from the scope of this invention.

What is claimed is:

1. An electronic switching circuit in a wideband reproducer system having a scanning assembly for scanning a storage medium, said medium having frequency modulated continuous signal information recorded on transverse tracks with overlapping information at the end and the beginning of the tracks comprising: means for deriving a plurality of frequency modulated information signals from said scanning assembly; a plurality of gating circuit means coupled to the output of said scanning assembly for passing the information signals to form a continuous composite information signal, said gating means adapted to gradually go from a conductive state to a nonconductive state; and means for controlling the switching of said gating circuit means between conductive and nonconductive states to pass the information signals in sequence by said gating circuit means, said control means including means for gradual transfer of the conduction state between each of the gating circuit means.

2. An electronic switching circuit for a wideband magnetic tape reproducer having a rotary head assembly for playback of frequency modulated continuous signal information recorded on transverse tracks on a magnetic medium with an overlap of information comprising: a plurality of gating circuit means for reversibly and gradually going from the conductive state to the nonconductive state when energized by trapezoid waveform signals; means for applying a plurality of frequency modulated information signals derived from said recorded magnetic medium alternately to said gating circuit means; means for developing a control signal comprising means for deriving a synchronizing pulse signal from said rotary head assembly; means for converting such synchronizing pulse signal to a first rectangular waveform signal; means for inverting said first rectangular waveform to provide a second rectangular waveform signal in antiphase with said first signal; means for shaping both said rectangular waveform signals to provide a pair of trapezoid waveform signals in antiphase; and means for applying said trapezoid signals to said gating circuit means so that said circuits conduct alternately to provide a substantially continuous composite signal.

3. An electronic switching circuit for a wideband magnetic tape reproducer having a rotary head assembly for playback of frequency modulated continuous signal information recorded on transverse tracks on a magnetic medium with an overlap of information comprising: a plurality of symmetrical diode gates, said diode gates having configurations such that when a control signal is applied simultaneously to each gate, one is forward biased and conducting whereas the other symmetrical gate is reverse biased and nonconducting; means for applying a plurality of frequency modulated information signals derived from said recorded magnetic medium alternately to said diode gates; a gate pulse generator for developing a control signal having ramp portions for application to said diode gates; means for applying a synchronizing pulse signal derived from said rotary head assembly to said pulse generator so that said control signal may be applied in synchronism with the information signals to the diode gates; and means for combining the output signals from said diode gates into a continuous composite signal with no overlap of information.

4. An electronic switching circuit as in claim 3 wherein said gate pulse generator comprises a flip-flop circuit and a low pass filter having a Bessel characteristic.

5. An electronic switching circuit for a wideband magnetic tape reproducer having a rotary head assembly for playback of frequency modulated continuous signal information recorded on transverse tracks on a magnetic medium with an overlap of information comprising: a rotary head assembly for providing first and second frequency modulated information signals, said information signals representing recorded signal intelligence having overlapping information; first and second diode gates coupled respectively to said rotary head assembly for receiving said first and second information signals respectively; means for controlling said gates to switch said gates alternately into conduction for providing an output signal, said controlling means including further means for obtaining predetermined portions of signal information from each gate during switching so that said signal portions are complementary and provide a signal having substantially the same amplitude as the output signal provided when only one gate is conducting to pass the information signal.

6. An electronic switching circuit for a wideband magnetic tape reproducer having a rotary head assembly for playback of frequency modulated signal information recorded on transverse tracks on a magnetic medium with an overlap of information comprising: a plurality of balanced diode gates, said diode gates having configurations such that one is conducting while the other is nonconducting; means for applying a plurality of frequency modulated information signals derived from said recorded tracks on said magnetic medium sequentially to said diode gates; means for applying a control signal having sloping portions to said diode gates to cause alternate conduction of said gates, said control signal consisting of two waveform signals in antiphase; and means coupled to the output of said gates for combining the output signals from said gates into a continuous composite signal having no overlap of information.

7. An electronic switching circuit for a wideband magnetic tape reproducer having a rotary head assembly for playback of frequency modulated continuous signal information recorded on transverse tracks on a magnetic medium with an overlap of information comprising: a plurality of gating circuit means for symmetrically becoming conductive and nonconductive when energized by a ramp waveform signal; means for applying a plurality of frequency modulated information signals derived sequentially from said recorded magnetic medium alternately to said gating circuit means; means for applying a control signal having ramp waveform portions to said gating circuit means and in synchronism with said information signals to pass information signals through said gating circuit means in sequence to provide slow switching of said gating circuit means between "On" and "Off" operation and to provide proportionate contribution to the output signal by each of said circuit means, whereby the amplitude of the frequency modulated output signal remains substantially constant.

8. An electronic switching system for combining a plurality of frequency modulated information signals having overlapping information into a continuous output signal comprising: a plurality of gating circuit means for passing such information output signal to form a continuous composite output signal, said gating means adapted to gradually go from a conductive to a nonconductive state when energized by an appropriate control signal; means for applying each of said plurality of information signals respectively to each of said plurality of gating circuit means; means for applying control signals to said gating circuit means, and for enabling said gating circuit means to gradually and alternately conduct, whereby a continuous composite signal having no overlapping information is provided.

9. An electronic switching system for combining a plurality of frequency modulated information signals having overlapping information into a continuous output signal comprising: a plurality of diode gating means for gradually conducting when a ramp signal is applied thereto; means for applying each of said plurality of information signals respectively to each of said diode gating means; means for applying control signals having ramp portions to said gating means to enable said gating means to conduct, said signals applied alternately to said gate means, whereby each gate gradually conducts and a continuous composite signal having no overlapping information is provided.

10. An electronic switching circuit for a wideband magnetic tape reproducer having a rotary head assembly for playback of continuous signal information recorded on transverse tracks on a magnetic medium with an overlap of information comprising: a rotary head assembly for providing first and second information signals, said information signals representing recorded signal intelligence having overlapping information; first and second diode gates coupled respectively to said rotary head assembly for receiving said first and second information signals respectively; means for controlling said gates to switch said gates alternately into conduction for providing an output signal, said controlling means including further means for obtaining predetermined portions of signal information from each gate during switching, said signal portions being complementary and adapted to provide a signal having substantially the same amplitude as the output signal provided when only one gate is conducting to pass the information signal.

References Cited in the file of this patent

UNITED STATES PATENTS

| | | |
|---|---|---|
| 2,245,286 | Marzocchi | June 10, 1941 |
| 2,557,085 | Fisk | June 19, 1951 |
| 2,876,295 | Irby | Mar. 3, 1959 |
| 2,880,329 | Rector | Mar. 31, 1959 |

OTHER REFERENCES

Journal of the Society of Motion Picture and Television Engineers, April 1957, pp. 184–188 (Vol. 66, No. 4).